United States Patent

Deschamps et al.

[11] Patent Number: 5,822,180
[45] Date of Patent: Oct. 13, 1998

[54] ENCLOSURE, FOR ELECTRICAL DEVICES

[75] Inventors: Jean-Christophe Deschamps, Nuits Saint Georges; Francis Schmit, Fontaine-Les-Dijon, both of France

[73] Assignee: Schneider Electric SA, Billancourt, France

[21] Appl. No.: 762,820

[22] Filed: Dec. 9, 1996

[30] Foreign Application Priority Data

Dec. 19, 1995 [FR] France .................................. 95 15695

[51] Int. Cl.$^6$ ..................................................... H02B 1/02
[52] U.S. Cl. .......................................................... 361/627
[58] Field of Search .................................. 361/627, 628, 361/807, 809, 810, 829, 832

[56] References Cited

U.S. PATENT DOCUMENTS 4,928,205  5/1990  Duback ................................... 361/627

FOREIGN PATENT DOCUMENTS

| 2 580 372 | 10/1986 | France . |
| 3813 003 C1 | 8/1989 | Germany . |
| 3923 104 C1 | 9/1990 | Germany . |
| 2 253 456 | 9/1992 | United Kingdom . |

*Primary Examiner*—Gregory D. Thompson
*Attorney, Agent, or Firm*—Oblon, Spivak, McClelland, Maier & Neustadt, P.C.

[57] ABSTRACT

Enclosure for housing devices or components of electrical distribution or control and equipped on one of its faces with an enclosure aperture which can be closed and made watertight through a fixed or swiveling door. The door is designed to receive control elements of the devices housed inside the enclosure and has a closing panel (30). The closing panel (30) consists of substantially transparent panel and has mounting plates (70) which are adapted to carry the control elements and which include penetration apertures (75)for these elements, the contour of the penetration apertures forming a cutting template for control element apertures (80) for the closing panel (30)for the passage of the elements through the closing panel.

13 Claims, 4 Drawing Sheets

ENCLOSURE, FOR ELECTRICAL DEVICES

FIELD OF THE INVENTION

This invention relates to an enclosure, in particular for devices or components of electrical distribution or control and equipped on one of its faces with an aperture which can be closed and made watertight through a fixed or swiveling means of blocking. This means of blocking is designed to receive control elements of the devices housed inside the enclosure and comprises a closing panel.

DISCUSSION OF THE BACKGROUND

At the present time, the installer wishing to add to an electric cabinet communication elements such as keyboards, control elements such as push-buttons or display elements such as visual indicators, display units or screens, incorporates these elements in the door of the cabinet by cutting openings in the sheet metal of the door to the dimensions of said elements. However, it is not easy to carry out such cuts in the metallic material of the door and over a large surface.

Another solution for fixing elements consists in cutting, in the door, standard-sized frames in order to fix aluminum plates which have are pre-cut apertures corresponding to the dimensions of the elements. Here, machining is easier than with the previous solution due to the fact that cutting to the dimensions of the communication and display elements is carried out on a support which is smaller than the door of the cabinet. It is nevertheless necessary to make preliminary cuts in the door, even if these are all of the same dimension, and then second cuts adapted to the elements.

Display elements such as display units or visual indicators need to be seen but not necessarily touched.

However, it is clear from the fixture solutions described above that, in order to fit the display elements in the door, the cuts have to be made because the entire door is opaque.

SUMMARY OF THE INVENTION

For an enclosure such as, for example, a cabinet comprising a means of blocking such as a door capable of receiving communication elements and/or display elements, the invention therefore aims both to provide this means of blocking with a structure making it possible to see the display elements without the need to make cuts, and to simplify the fitting of communication elements.

According to the invention, the enclosure is characterized in that the closing panel consists of a substantially transparent plate and in that it comprises plates capable of carrying control elements and including penetration apertures for these elements, the contour of the apertures forming a cutting template in the closing panel through which said elements are passed.

The apertures are preferentially formed by the pushing in of cuttable zones drawn in the solid plates.

The plates are fixed mechanically on a chassis which advantageously strengthens the closing panel and which is firmly attached to the panel by means of gluing. The chassis comprises angles for fixing the plates spaced from each other by an interval which is a multiple of a given pitch. The angles also make it possible to mark off separate zones for various types of control elements such as display, parameterization or command elements.

In addition, the closing panel may present an opaque sheet firmly attached to all or part of its inner face. Transparent windows are cut in this sheet in order to visualize the control elements from the cutting template determined by the contour of the plate apertures.

BREIF DESCRIPTION OF THE DRAWINGS

The features and advantages of the invention will emerge from the following description and the accompanying drawings. In these drawings.

DESCRIPTION OF THE PREFERRED EMBODIMENTS

Figure 1:
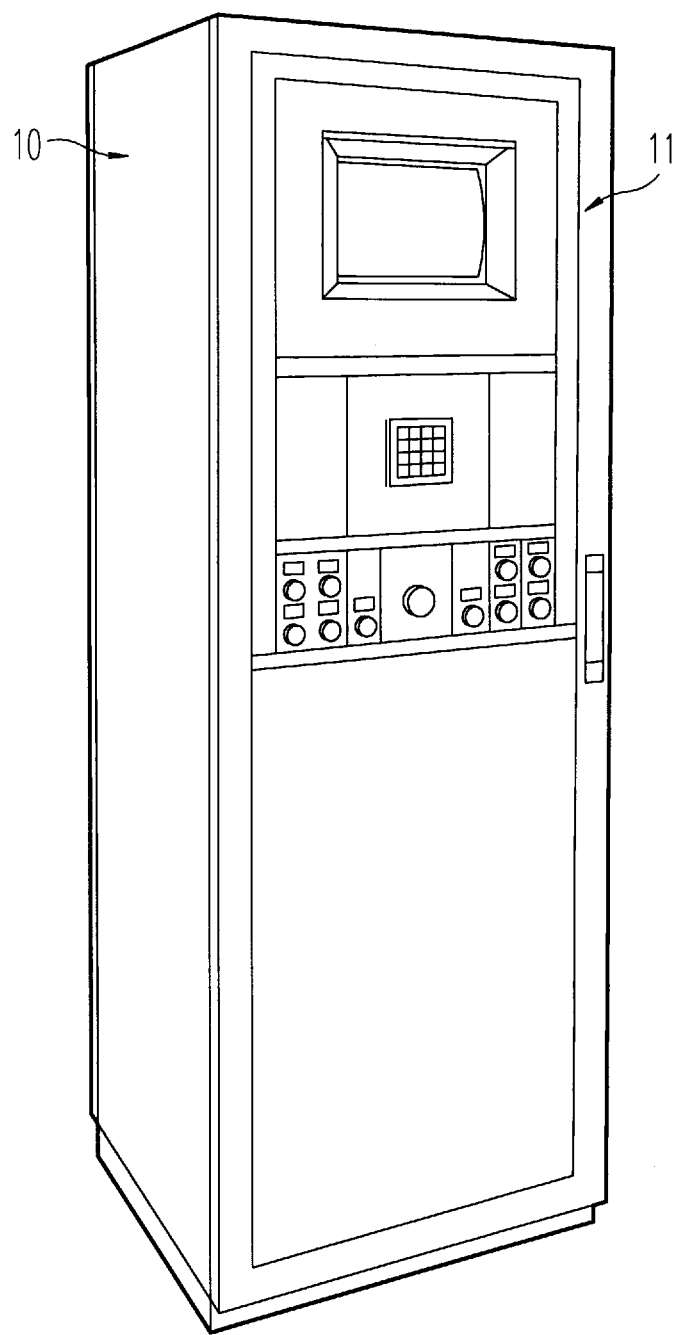
FIG. 1 illustrates an electrical distribution enclosure such as a cabinet.

The enclosure 10, illustrated in FIG. 1, shows an electric cabinet containing devices or components of electrical distribution or control. The enclosure could also represent an electrical distribution box or a control console.

Figure 2:
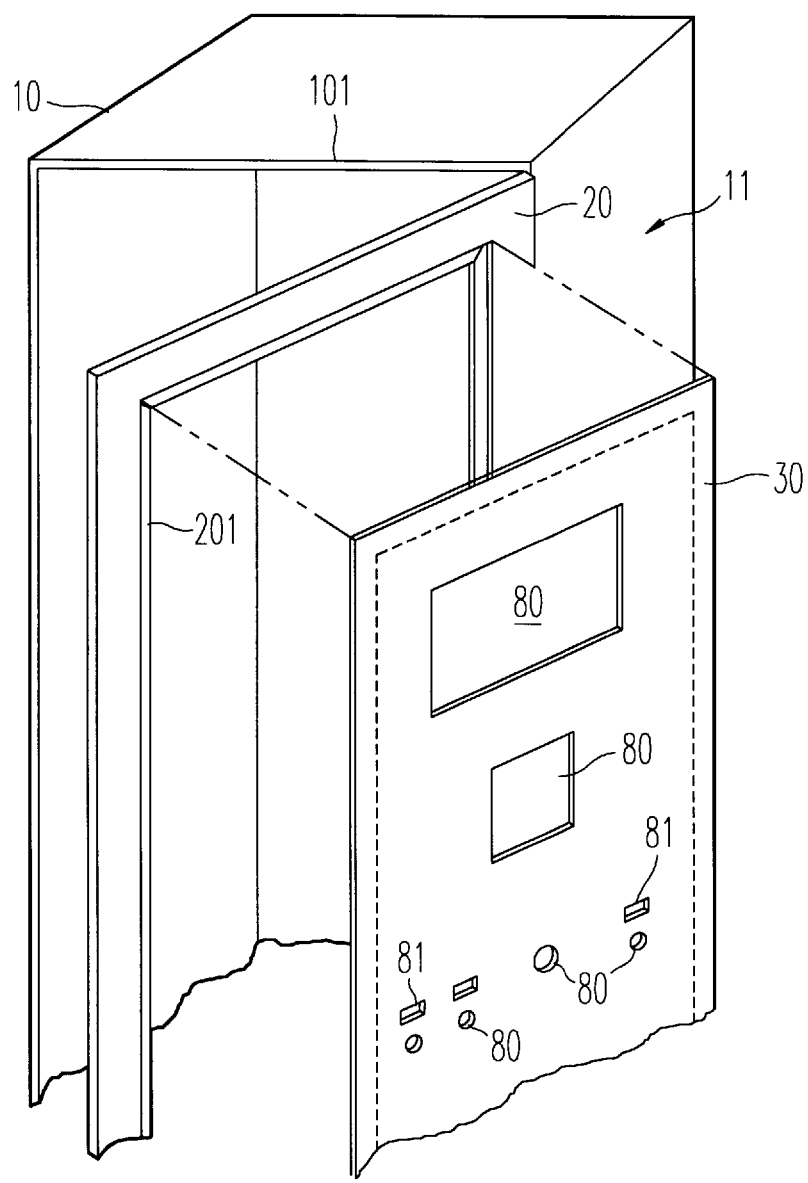
FIG. 2 illustrates part of a means of blocking designed to ensure the closing of an aperture of the enclosure.

FIG. 2 shows a means of blocking, such as a door, 11 designed to close an aperture of the enclosure 10.

The door 11 presents a profiled frame 20 and a closing panel 30 attached to the inner contour 201 of the profiled frame 20.

The profiled frame 20 of the door includes means known per se of joining the door to the enclosure, such as hinges, and when closed cooperates with the frame 101 demarcating the aperture of the enclosure to form a watertight seal.

The door 11 is designed to receive the control elements of the appliances housed inside the enclosure. The expression "control elements" is understood to include all types of display elements such as display units or visual indicators, communication elements such as keyboards or command elements such as push-buttons. They are carried by plates 70. In the embodiment described hereinafter, the plates are mounted on a chassis 40 firmly attached to the inner face 31 of the closing panel 30 of the door (FIG. 3), but in a variant, they could be directly attached to the closing panel by gluing the inner face 31 of said panel.

Figure 4:
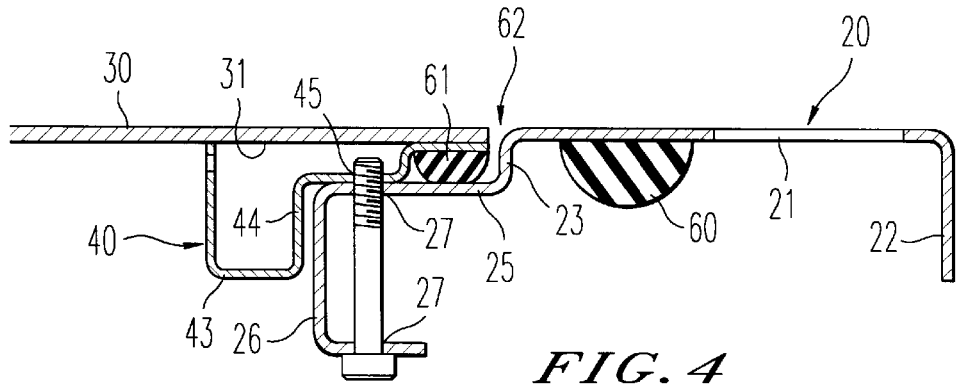
FIG. 4 shows a partial view of a section of FIG. 3.
Figure 5:
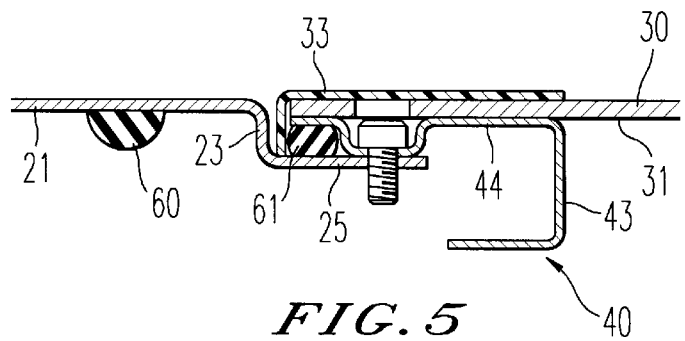
FIG. 5 shows a variant of FIG. 4.

As illustrated in FIG. 4, the profiled frame 20 of the door presents a section with a U-shaped cross section including a bore 21 and two outer 22 and inner 23 parallel wings connected perpendicularly to the bore 21. The inner wing 23 presents along its longitudinal free side an edge 25 folded at right angles, parallel to the bore 21 and comprising a return 26 in order to stiffen the edge 25. The edge 25 and its return 26 are fitted with functional perforations 27 placed at intervals on the contour of the frame. FIG. 5 shows a variant of FIG. 4.

When the door 11 is closed on the aperture of the enclosure 10, watertight sealing is ensured by a peripheral seal 60 which extends inside the U of the profiled frame 20 and is applied against the frame 101 of the enclosure.

The closing panel 30 of the door consists of a stiff or flexible plate made of material which is more or less transparent and is easy to machine.

The chassis 40 designed to receive the plates 70 is firmly attached to the inner face 31 of the panel 30.

The chassis 40 consists of two vertical columns 41 and two crosspieces 42 connecting the columns 41. The columns 41 and the crosspieces 42 are sections whose cross-section includes (FIGS. 4 and 5) a bore 43 and at least one wing 44 linked to the bore and fitted with perforations 45 according to the height of the columns and the length of the crosspieces.

The chassis 40 is firmly attached to the closing panel 30 by means of any kind of assembly, preferably gluing, of the wing 44 of the columns and the crosspieces to the inner face 31 of the panel.

The closing panel 30 is fixed to the profiled frame 20 of the door by means of the chassis 40 firmly attached to the panel, the vertical columns 41 and the crosspieces 42 of the chassis 40 being fixed mechanically to the profiled frame 20 through cooperation of the perforations 45 of the chassis with the perforations 27 of the edges 25 of the frame so as to allow the passage of assembly bolts. Once fixed, the closing panel 30 and the bore 21 of the profiled frame are coplanar.

Bolting may be carried out from the rear of the panel, that is to say from the inside of the door (FIG. 4) or from the front of the panel (FIG. 5). With reference to external bolting as illustrated in FIG. 5, holes must be made in the thickness of the panel through a few perforations 45 of the chassis in order to insert screws and bolts in the chassis 40 and the profiled frame 20. A mask 33 may be added on the outer face of the panel in order to conceal the screws and bolts once assembly is complete. The external bolting option is particularly advantageous for enclosures whose interior becomes inaccessible when the means of blocking the aperture located on a wall of the enclosure does not swivel, unlike a door attached to the enclosure, but is fixed and constituted, like a porthole, solely by a closing panel. In this latter case, moreover, the panel is fastened by direct fixing of the chassis onto the structure of the enclosure and in such a way that the panel is on the same plane as the wall of the enclosure.

The watertight sealing between the profiled frame 20 and the closing panel 30 is ensured by seals 61 placed at the free extremity of the wings 44 of the section of the chassis 40 so as to rest against the edge 25 of the wings of the profiled frame 20 in order to seal the junction 62 between the profiled frame and the closing panel firmly attached to the chassis.

The chassis includes adjustable angles 50 placed transversely to the columns 41 of the chassis and on which the plates 70 receiving the control elements are fitted.

The angles 50 show two sides which are folded at right angles and fitted with a perforated structure 51. The angles 50 are fixed to the columns 41 by their side which is parallel to the columns so that the perforated structure 51 cooperates with the perforations 45 of the columns in order to allow the passage of screws and bolts.

The angles 50 are spaced from each other at intervals of a multiple of a pitch p, for example equal to 25 mm, so as to facilitate the assembly of the plates 70 whose height is a multiple of the pitch p.

The angles make it possible to mark off different zones whose height may be adjusted according to the type of element to be placed in each zone. For example, three zones may be distinguished from top to bottom, consisting of a display zone, a parameterization zone and a command zone, these said zones being designed to receive respectively display elements, communication elements and command elements.

Moreover, the right-angled interior of the angles 50 is arranged as a duct for the passage of wiring and control elements, the wiring being kept in position by means of clip-on attachments in the perforated structure 51 of the angles.

The plates 70 receiving the control elements include teeth 71 and/or assembly holes 72 which are designed to cooperate with the perforated structure 51 of the angle 50 and/or with the perforations 45 of the columns 41 and the crosspieces 42 in order to bolt them onto the chassis 40. In an assembly variant, the plates 70 may be clipped to the chassis 40. The plates have an outer face 73 directed to and parallel to the inner face 31 of the closing panel 30, and an inner face 74 opposite to the outer face and directed towards the interior of the enclosure when the door is closed.

The plates 70 are made of metal and, depending on the control element to be attached, may assume various shapes and sizes. However, they all have in common at least one opening 75 for the passage of an element in such a way that the front face of the element projects in relation to the outer face 73 of the plates. The element is fixed on the inner face 74 of the plates through means known per se.

Provision is made for an opaque sheet firmly attached to the inner face 31 of the panel 30 on the contour of the panel, on the gluing surface between the panel and the chassis 40. The plates 70 are made of colored sheet metal, are solid and fitted with cuttable zones which, once pushed in, constitute the openings 75. The solid plates cover the entire surface of the transparent panel 30.

The contour of the openings 75 determines a cutting template in the closing panel 30 of apertures 80 allowing the passage of the control elements which are to cross the panel 30. Thus, the contour of the apertures 75 makes it possible to guide the cutting tool and to make apertures 80 to substantially the same dimensions as those of the apertures 75 for the elements which are to cross the panel 30.

Figure 3:
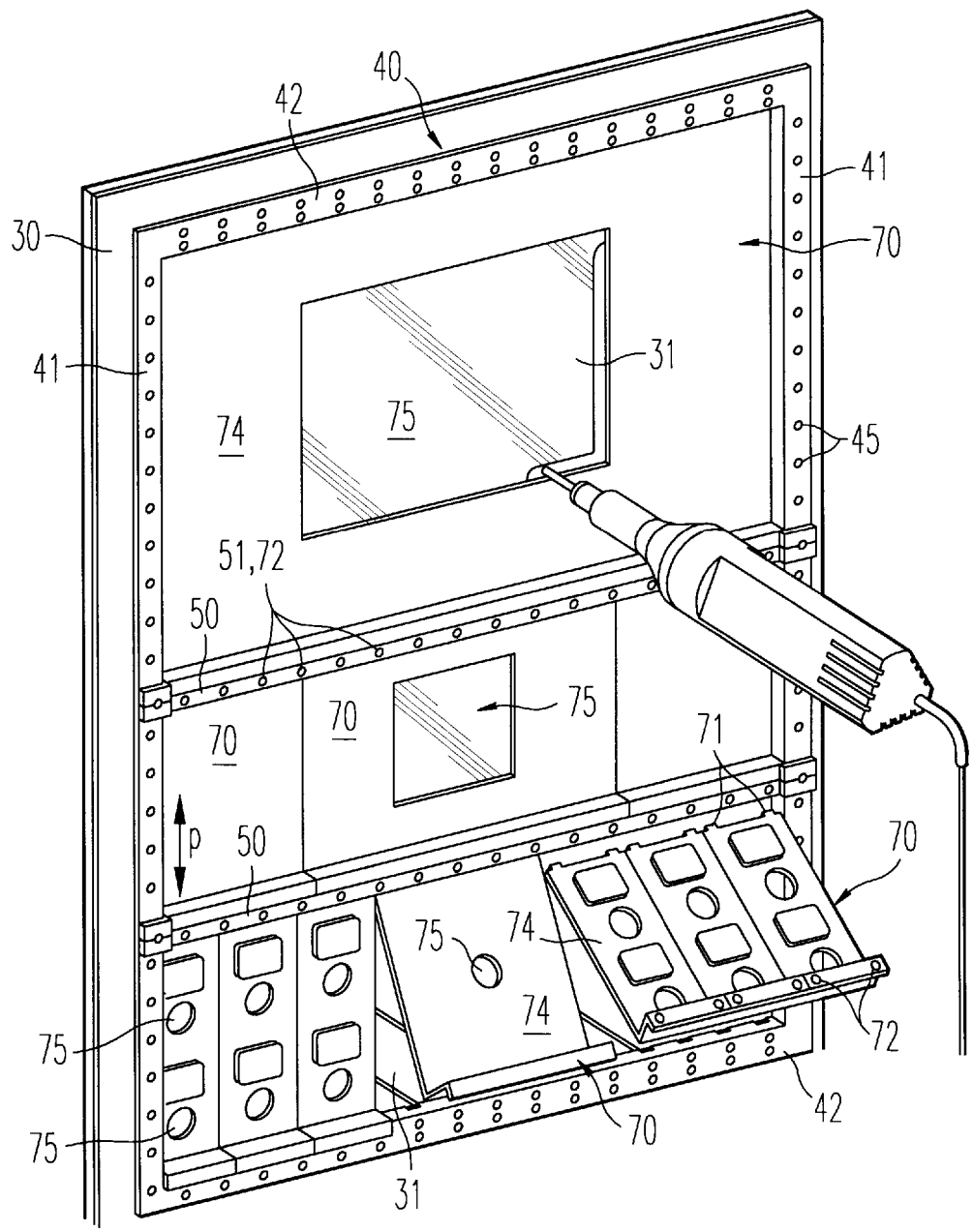
FIG. 3 shows the inner face of part of the means of blocking.

The apertures 75 also determine, in the closing panel 30, substantially transparent display windows 81 for the control elements such as display elements, or for labels which need to be seen, but not necessarily touched, through the plate of the panel (FIGS. 2 and 3).

In a variant embodiment, an opaque sheet is provided which is solidly attached to the entire inner face 31 of the panel 30 so as to make the plate of the panel opaque and thus the interior of the enclosure not visible when the plates 70 do not cover the entire surface of the panel. The contour of the apertures 75 of the plates still determines the cutting template of the apertures 80 and, only in the thickness of the opaque sheet without cutting into the thickness of the plate of the panel 30, the windows 81.

An aperture 75 of a plate may be rectangular when, for example, the plate supports a rectangular-shaped display unit.

Figure 6:
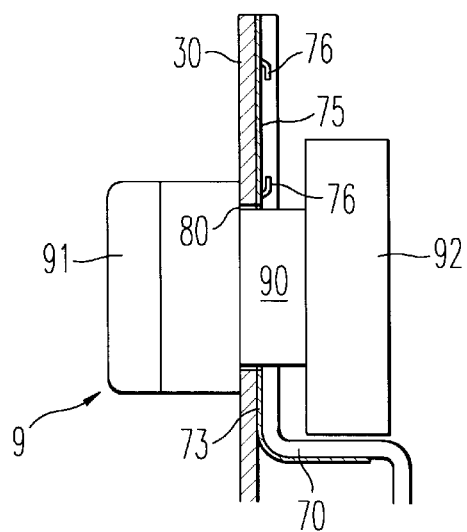
- FIG. 6 shows a partial view of another section of FIG. 3.

An aperture 75 of a plate may also be round when, for example, the plate supports a push-button 9 such as illustrated in FIG. 6. The body of the button shows a tubular part 90 lying between the head 91 and the base 92 of the body of the button and designed to be inserted in the aperture 75.

A push-button or a visual indicator is often accompanied by a label indicating its use or respectively its representation. In such cases an additional aperture 75 may be made in the plate in order to visualize the label fitted on the inner face 74 side of the plate. The label is slid along runners 76 arranged on each side of the additional aperture and formed by lugs firmly attached to the inner face 74 of the plate. In a variant, the label may be slipped into a transparent plastic labelholder which can be clipped into the aperture 75.

The label advantageously presents on a same side indications which are written head-to-tail, for example a function or a wiring code, in such a way that, once the label has been folded at the point of separation between the two inscriptions and introduced into the runners, the user of the control elements can visualize, on the outer face side of the plate, the function of a control element, while on the inner face side the installer can easily perform the electrical wiring of this control element thanks to the inscribed wiring code.

By means of the structure of the closing panel as described above and comprising notably the transparent plate and the plates 70 which permit the assembly and fixture of the control elements and which act as cutting template of the transparent plate and, if required, the opaque sheet, it is easy to make apertures 80 in order to reveal communication or command elements projecting from the door, and transparent windows 81 in order to observe the display elements, without having to disassemble the panel support, that is to say the door 11 in the application described.

This panel structure thus enables the installer to assemble and wire the control elements on a closing panel of an enclosure in a place which is independent from the place where the enclosure on which the panel is to be mounted is located.

We claim:

1. An enclosure for housing devices, comprising:

a first face defining an enclosure aperture;

a blocking means for covering said enclosure aperture to form a watertight seal, said blocking means including
   a frame;
   a closing panel mounted on said frame, wherein said closing panel includes
   a substantially transparent plate,
   a plurality of mounting plates for receiving a plurality of control elements for the devices, including
   a first group of said plurality of mounting plates, each one of said first group having at least one penetration aperture formed in the shape of a cutting template for locating a control element aperture for passage of at least one of said plurality of control elements through said closing panel, and
   mounting means for mounting said plurality of mounting plates on said substantially transparent plate.

2. An enclosure for housing devices according to claim 1, wherein said plurality of mounting plates further includes:

a second group of said plurality of mounting plates, each one of said second group having at least one penetration aperture formed in the shape of a control element exposing window to provide an opening for exposing at least one of said plurality of control elements through said substantially transparent plate.

3. An enclosure for housing devices according to Claim 1, wherein said at least one penetration aperture is formed by pushing in a cuttable zone provided for at least one mounting plate of said first group.

4. An enclosure for housing devices according to Claim 1, wherein said blocking means include a swiveling means for covering said enclosure aperture.

5. An enclosure for housing devices according to Claim 1, wherein said blocking means include a fixed means for covering said enclosure aperture.

6. An enclosure for housing devices according to Claim 1, wherein: said substantially transparent plate has an inner face, and said mounting means includes glue for gluing said plurality of mounting plates to said inner face.

7. An enclosure for housing devices according to claim 1, wherein said mounting means further comprises an opaque sheet.

8. An enclosure for housing devices according to Claim 7, wherein:

each one of said at least one penetration aperture of said second group provides a window cutting template for exposing at least one of said plurality of control elements through said opaque sheet.

9. An enclosure for housing devices according to claim 1, wherein said mounting means further comprises:

a chassis for reinforcing said closing panel and for receiving said plurality of mounting plates by mechanical attaching means.

10. An enclosure for housing devices according to Claim 9, wherein said chassis is attached to said closing panel by gluing means.

11. An enclosure for housing devices according to Claim 9, wherein: said blocking means comprises a door mounted on said enclosure, said door including said frame, said chassis including watertight sealing means for sealing watertight said closing panel to said frame.

12. An enclosure for housing devices according to Claim 9, wherein:

said mechanical attaching means comprises a plurality of angles for mounting said plurality of mounting plats, said plurality of angles spaced from each other at an interval which is a multiple of predetermined pitch, each of said plurality of angles defining a distinct zone for differing types of said plurality of control elements.

13. An enclosure for housing devices according to Claim 12, wherein:

each of said plurality of angles has a perforated structure and a right-angled interior forming a duct for passage of wiring for said plurality of control elements, wherein said wiring is secured to said plurality of angles by clip-on attachment means in said perforated structure.

* * * * *

UNITED STATES PATENT AND TRADEMARK OFFICE
CERTIFICATE OF CORRECTION

PATENT NO. : 5,822,180
DATED : October 13, 1998
INVENTOR(S) : Jean-Christophe DESCHAMPS, et al.

It is certified that error appears in the above-identified patent and that said Letters Patent is hereby corrected as shown below:

On the title page, Item [73], the assignee address is incorrect. It should be:

--Boulogne Billancourt, France--

Signed and Sealed this

Eleventh Day of May, 1999

Attest:

Q. TODD DICKINSON

*Attesting Officer*     *Acting Commissioner of Patents and Trademarks*